Patented July 30, 1940

2,209,753

UNITED STATES PATENT OFFICE 2,209,753

MAGNESIUM CARBONATE COMPOSITION AND METHOD OF PREPARATION

Samuel A. Abrahams, San Francisco, and Rubin Lewon, Menlo Park, Calif., assignors to Plant Rubber & Asbestos Works, San Francisco, Calif., a corporation of California No Drawing. Application June 9, 1938, Serial No. 212,698

3 Claims. (Cl. 23—67)

Our invention relates to magnesium carbonate compositions, and more particularly to an improved magnesium carbonate composition which has the property of self or hydraulically setting with substantially no shrinkage, and also to an improved process for producing such self-setting composition.

Magnesium carbonates are used in sound and heat insulating and similar materials, and have generally comprised either the heavy basic carbonate or the light basic carbonate, or modifications of these materials. These basic carbonates have been prepared by various methods, a common method being that of gassing with carbon dioxide-containing gas an aqueous suspension of magnesium hydroxide to precipitate basic magnesium carbonate. Another type of method is disclosed in the patent to Samuel A. Abrahams, one of the co-applicants of this application, No. 2,027,714, dated January 14, 1936. Briefly, the method of such patent comprises precipitating basic magnesium carbonate from bitterns remaining as residual liquors after crystallization of sodium chloride resulting from the evaporation of sea water, by reaction with an aqueous solution of an alkali metal carbonate, and creating a certain character of precipitate by the application of heat at a temperature between 160° F., and 200° F.

In such prior methods, it was necessary in order to form the magnesium carbonate in blocks or slabs of the desired size and shape, to mold the product in suitable forms under a relatively high mechanical pressure, because the magnesium carbonate did not have self-setting properties or could not undergo a hydraulic set. This molding equipment was expensive to maintain and operate as well as to construct. Furthermore, because of the pressure applied during the molding, the product was compacted and consequently made more dense than would occur in a corresponding product having self-setting properties. This, of course, rendered it impractical to intermix with such prior product comparatively large quantities of other heavier materials which might have been otherwise desirable, because the increased density which resulted from such large quantities produced a product having a unit weight too high for commercial specifications. Consequently, the percentages of these foreign materials which could be included, was limited.

Our invention has as its objects, among others, the provision of an improved light weight self-setting magnesium carbonate composition having great strength and improved insulating properties, and which can be produced by an economical method. Other objects of the invention will become apparent from a reading of the following description thereof.

In general, we have discovered that if the type of process wherein magnesium carbonate is precipitated by reaction of a magnesium compound with a carbonate salt (such as the particular process disclosed in the Abrahams patent mentioned previously), is conducted so as not to destroy the comparatively fine magnesium carbonate needle-like crystals which commence to form shortly after the reaction is initiated and if the reaction is so performed as to leave substantially all the precipitated magnesium carbonate in the form of the fine needle-like crystals, such type of magnesium carbonate crystals, which form normal magnesium carbonate have self-setting properties. Although such self-setting normal magnesium carbonate crystals are always formed by the type of reaction mentioned, their self-setting properties were not recognized, and they were destroyed by subsequent process steps, usually by the application of heat at too high a temperature.

If a slurry of such normal magnesium carbonate crystals having self-setting properties is cast or poured into a form or mold, the composition will set in a quiescent state without application of mechanical pressure thereto, to provide the self-setting product of our invention. The setting in the mold is enhanced by application of heat. In other words, we have found that a normal carbonate of magnesium in the form of comparatively thin needle-like crystals resulting from the described type of reaction, has hydraulic or self-setting properties rendering it unnecessary to mold the composition under pressure to form slabs or blocks. Although the product of our invention has the property of self-setting in a quiescent state without application of pressure thereto, and this is the manner employed by us for producing the product, it will also set if pressure is applied as in other methods heretofore known, and still produce a stronger product than has heretofore been possible by such other methods. Inasmuch as pressure molding is necessary to produce a satisfactory product manufactured by other methods and in view of the fact that pressure may be applied to the product made by the process of our invention but is not necessary, the expression "independent of pressure" is employed hereinafter to describe that the product of our invention has self-setting properties not conditioned on pressure.

In the preferred process of our invention, we economically employ as a source of raw materials for obtaining the desired crystalline magnesium carbonate precipitate, magnesium bittern and a concentrated aqueous sodium carbonate solution which may be made from either soda ash or calcined trona. If trona, which is a natural deposit of sodium carbonate and sodium bicarbonate, is employed, it is preferably calcined to the point where substantially no sodium bicarbonate is left. This is done to minimize as much as possible the formation of water-soluble magnesium bicarbonate because it has been found to slow up setting, and because of its solubility results in loss of magnesium.

These materials may be obtained economically on the Pacific coast; particularly the bittern which occurs as a by-product in the manufacture of salt from sea water, permitted by the climatic conditions on the Pacific coast. The reaction in the beginning is quite similar to that disclosed in the Abrahams patent, stoichiometric quantities of the bittern and the alkali metal carbonate being employed. Although any suitable concentrations of the bittern and the alkali metal carbonate solutions may be employed, we prefer to employ solutions of these substances which are quite concentrated because we have found that the reaction resulting from more concentrated solutions produces a more desirable type of crystal insofar as self-setting properties are concerned.

The reaction is performed in an aqueous vehicle; the total water content preferably being from 10 to 20 parts by weight to one part by weight of the reacting substances. A satisfactory commercial ratio is about 15 or 16 parts of water to one part of the reacting substances. It is undesirable to have too much water because of unnecessary bulk and because, as was previously stated, a more desirable reaction occurs when the water content is relatively low. Too little water obviously impedes the rate of reaction.

Unlike the process in the Abrahams patent, the reaction herein is carried on under vigorous or excessive agitation. Mechanical agitation by any suitable agitating mechanism may be employed, but agitation by introducing a stream or streams of compressed air into the vessel in which the reaction occurs, is more desirable. Such vessel is preferably open to the atmosphere as the reaction occurs under atmospheric conditions, although it can also be obtained in a vessel maintained under pressure or vacuum but this is unnecessary. Agitation has been found to form small and thin crystals which are desirable because the smaller and thinner the crystals, the stronger the final product. This is probably due to the fact that with small thin crystals there is a greater interlacing thereof to provide a firmer bond upon setting of the product.

The process is at present perferably performed in batches. When the first reaction bath is started, it is desirable to heat the batch as this has been found to facilitate and hasten the reaction. However, care must be taken that the temperature of the bath is not allowed to rise at any time above the point where the fine needle-like normal magnesium carbonate crystals which are formed, lose their character because then their self-setting properties are destroyed. The temperature should not be permitted to rise much over 120° F., and preferably, the temperature should be maintained between 75° F. and 90° F. In the process of the Abrahams patent referred to, the self-setting magnesium carbonate crystals are destroyed by the high temperature applied during the later steps of the process.

Live steam introduced directly into the batch provides a suitable heating means and also cooperates to effect agitation. Hence, it is preferred, although any other suitable heating means, such as heating coils in the vessel or external heat, may be employed instead. If some of the magnesium carbonate crystals from the first batch are left in the vessel, such crystals serve as a seeding means and expedite formation of succeeding crystals, thus shortening the time of reaction which is advantageous from the viewpoint of commercial economy.

The magnesium carbonate crystals may also be obtained by the reaction of any other magnesium compound and any other water-soluble carbonate which are known upon reaction to precipitate substantially water-insoluble magnesium carbonate. For example, Epsom salts or magnesium containing brines found in wells, and any other water-soluble carbonate, such as any of the alkali metal carbonates, can be employed.

When the reaction first commences, the batch has a comparatively thin consistency, but as the reaction proceeds and the fine needle-like self-setting magnesium carbonate crystals begin to form, the batch thickens. A skilled operator or observer will be able to determine when substantially all of the magnesium carbonate is in the form of the desired self-setting magnesium carbonate crystals, because when such point occurs, the batch has a maximum thickness, being almost gelatinous in character, and then immediately starts to thin out. This is one way by which the operator can tell when the reaction is at the proper end point.

However, the most accurate and preferred way to ascertain the proper end point of the reaction is by taking frequent successive samples from the batch as the reaction proceeds and making microscopic analyses of the crystals in such samples. At first, when the reaction has just been initiated by intermixing of the reacting substances, the precipitate is not in the form of needle-like normal magnesium carbonate crystals, but appears under the microscope more in the form of amorphous grape-like clusters. The fine needle-like crystals form as the reaction continues; and successive early samples thereof show more and more of such crystals.

When the reaction is at the desired end point, substantially all of the magnesium carbonate precipitate appears under the microscope to be in the form of very fine (not fat), needle-like crystals, ranging from 20 to 50 microns in length, and from 2 to 5 microns in thickness. At such end point, agitation, and the application of heat if applied, are terminated; and the crystals are ready for succeeding steps of the process. The length of time for the reaction to be completed in the first batch which is heated, although not critical, is usually from 20 minutes to ½ hour. For succeeding batches in which the crystals are formed by seeding in the manner explained above, the reaction is much faster.

By virtue of the presence of small quantities of sodium bicarbonate sometimes occurring in commercial sources of the sodium carbonate or calcined trona, a small amount of water-soluble magnesium bicarbonate is formed in the reaction vehicle, which has been found to slow up the subsequent setting, as was previously mentioned. To neutralize any small amount of water-soluble magnesium bicarbonate which might be formed in the reaction vehicle and thereby preclude it from slowing up the setting of the magnesium carbonate crystals, should all the bicarbonate be not washed away from such crystals during a washing operation to be subsequently described, we may add to the reaction vehicle a quantity of caustic or active magnesium oxide, i. e., magnesium oxide which is not dead burnt, sufficient to react with all the water-soluble magnesium bicarbonate to precipitate magnesium carbonate. This also increases the yield. Lime, or any other alkali which will react with water-soluble magnesium bicarbonate to precipitate an insoluble carbonate, may be employed instead of the magnesium oxide; the magnesium oxide being preferred to lime, because it does not adulterate the product and because it imparts additional strength to the final set product. The addition of the neutralizing medium is not necessary, but its employment may be desirable for the reasons stated.

We prefer to add directly to and mix in the reaction vehicle, the usual types of reenforcing materials, such as asbestos fiber, in an amount sufficient to provide a final product which contains from 10% to 15% by weight of the fiber; such product being generally that employed commercially for heat insulation. Other chemically inactive solid bodies, such as vermiculite or diatomaceous earth, may be also mixed in the reaction vehicle. However, such inert filler or reenforcing fiber may be introduced at any suitable subsequent or prior point if so desired.

As soon as the end point of the reaction is reached, namely when substantially all of the normal magnesium carbonate precipitate is in the form of the desired crystals, and the other material is added to the reaction vehicle, water-soluble impurities including magnesium bicarbonate are removed preferably by filtration and washing, and the water content of the mass is simultaneously adjusted by removal of excess water to control the density of the final set product. A suitable type of filter is an "Oliver" continuous rotary vacuum filter in which removal of excess water, filtration and washing may be done simultaneously.

The resulting magnesium carbonate slurry, after washing and separation of the desired amount of water, is now ready to be set. If the resultant slurry is not already markedly alkaline by virtue of the addition of magnesium oxide or equivalent material to the reaction vehicle, we preferably intermix with the slurry to hasten and also control the setting of the product in the molds, and at the same time increase the strength of the final product, an excess of an alkali having the property of consuming carbon dioxide which may be by absorption, adsorption or reaction, such as preferably caustic or active magnesium oxide, an alkali metal hydroxide such as sodium hydroxide, or borax for a reason to be subsequently explained. Other alkalies, such as lime, may also be employed, but alkalies of this type are not preferred because they cause too much adulteration of the final product. In this connection, enough alkali should be added to render the slurry markedly alkaline, as the slurry has been found to set better when markedly alkaline.

In the setting operation, the slurry is cast or poured directly into forms or molds which are heated for a length of time and at a temperature sufficient to set the slurry or sludge to a firm cake. Agitation of the crystals in the molds is avoided because such agitation will impair the setting of the crystals. Hence, the setting in the molds is accomplished with the crystals in a quiescent state. The composition has substantially no shrinkage on setting and no pressure need be applied to it to accomplish the setting. Consequently, the density of the final product is governed by the quantity of water left in the slurry which is poured into the molds.

During the setting, we have found that carbon dioxide gas is given off; and microscopic observation of the set product shows that the material which was originally all comparatively thin or fine needle-like crystals now consists essentially of a mixture of two crystal forms. Some of the original needle-like crystals remain but a new, very small crystal appears. Such new crystal tends to cluster into grape-like groups, or to adhere to the surface of the needle-like crystals. This probably accounts for the great strength of the final product, which breaks with a clean fracture, in contradistinction to the product of the prior processes, which mushes upon being broken, thus indicating that the product of our invention is bonded by the interlacing of the crystals.

Because of the evolution of the carbon dioxide and the formation of the new crystals, we are led to believe that a reaction probably occurs in which some of the normal carbonate of magnesium is converted to light basic magnesium carbonate. The carbon dioxide-consuming alkali which is preferably added to the slurry prior to the setting operation, controls and hastens the setting which is preferably conducted in an enclosed chamber, not only because the setting occurs faster when the slurry is made markedly alkaline, but also because the consumption of some of the carbon dioxide reduces the carbon dioxide pressure in such chamber, and thus by the principle of the law of mass action causes the reaction to proceed faster toward the side of the set product. Also, such alkali since it consumes carbon dioxide, controls the rate of evolution thereof and precludes formation of fissures in the interior of the setting product, which might otherwise result from too rapid an evolution of the carbon dioxide, with consequent weakening of the final product. For any given setting conditions, the length of time of the set may be regulated by the quantity of the carbon dioxide-consuming alkali which may be added to the slurry; the more alkali added within practical limits, the faster being the set. If magnesium oxide alone is added, usually an amount thereof ranging from 1% to 5% by weight of magnesium carbonate, is employed; while borax alone is used in an amount usually ranging from 1% to 2% by weight of magnesium carbonate. An alkali metal hydroxide, such as sodium hydroxide, being much stronger, is employed in lesser quantities; 0.1% to 1% by weight of magnesium carbonate being usually sufficient. Mixtures of the carbon dioxide-consuming alkalies may, of course, be employed if so desired. The addition of the carbon dioxide-consuming alkali, although very desirable for enhancing the set and increasing the strength of the final product, is not essential.

Although no pressure is required to compact or mold the material, pressure molding may be employed and still produce a superior product, or a special dense product for certain purposes. However, such pressure molding is preferably omitted where the final product is intended for heat insulation, inasmuch as it would increase the density. The temperature applied to the molds during setting should not be too high or applied too rapidly, because although the product will set, the evolution of gas is so rapid as to leave the final product with gas holes. Neither should the temperature be too low, because then the setting is, generally speaking, too slow for practical purposes. A suitable temperature range under atmospheric pressure is substantially from 140° F. to 195° F. At this temperature range, the setting to a hard cake will usually occur in from ½ to 3 hours, the time varying with the temperature actually applied, and also with the chemical and physical character of the composition, as well as the thickness of the mass. Preferably, the setting is effected by placing the slurry filled molds in an enclosure maintained at the desired temperature by live steam, although any other suitable heat may be employed instead. It is desirable that the enclosure in which the setting is conducted be substantially free of drafts to the outside atmosphere because drafts might cause evaporation of moisture and this tends to cause undesirable shrinkage.

The composition sets normally substantially without shrinkage which is important, because if it were to shrink materially, then of course its final shape could not be fixed by the mold, and wasteful trimming would have to be employed to produce the desired shape block or slab. Also, by not shrinking, the density of the product is not increased during the setting thereof, which is important for controlling the final weight of the product, as determined by the amount of water which is in the slurry to be set. In this connection, after the previously described filtering and washing of the slurry, if it does not have the desired water content to produce the desired density of the final product, water may be added to the slurry in an amount necessary to produce the desired density. Thus, the density of the final product may be controlled by adjusting the water content of the slurry to be set. Under some circumstances, slight shrinkage of the composition might occur during setting, but not as much as the shrinkage which occurs in other commercial processes wherein mechanical pressure molding of the composition is absolutely necessary to produce a satisfactory product.

After having set in molds, the blocks or slabs which are formed are self-supporting before they are dry and while containing considerable moisture. Blocks or slabs formed in other commercial processes where the magnesium carbonate is placed in filter molds and pressure molding is employed simultaneously with expulsion of water through perforations in the molds, are not self-supporting; and consequently they have to be supported in frames after they are removed from the molds, so that they will not break during handling prior to drying thereof. The method of our invention, therefore, eliminates the necessity of having to provide frames to support the molded products after removal from the molds.

Upon removal of the slabs or blocks from the molds after setting thereof, they are next dried in the usual manner heretofore employed for drying the mechanically molded product. Such drying is accomplished usually in conventional drying ovens at a temperature ranging from 155° F. to 395° F., to remove all uncombined or free water not existing as water of crystallization. Depending on the temperature and draft, it will take from 24 to 72 hours for the drying. The drying, if desired, may be air drying, but oven drying is preferred because it is faster. Should the material tend to stick in the molds upon removal therefrom, the molds may be first greased with any suitable substance such as petroleum grease.

Even though there is substantially no shrinkage of the material in the molds, it may be desirable to mill or trim the surfaces of the dried product so as to provide an attractive product not marred with surface imperfections. Not over 10% of the product need be removed by such milling, whereas with products produced by other methods wherein molding under pressure is required, the amount of product removed by milling runs from 30% to 40%. The milled-off material is not entirely waste material because it may be used for making magnesia insulating cement. However, it has less value as a cement, and therefore results in an economic loss. Hence, because of the lesser amount of material which need be trimmed from the block or slab of our invention, a further economy results. Because the product of our invention sets in a quiescent state substantially without shrinkage, the molds may be made of special shapes so as to form correspondingly shaped insulating fittings.

Standard commercial products of magnesium carbonate insulating blocks produced by former pressure molding methods contain about 85% by weight of magnesium carbonate as a bonding agent and about 15% by weight of asbestos fiber to reenforce the product. Under present standards, such blocks weigh from 16 to 18 lbs. per cubic foot; the specific gravity, therefore ranging from .25 to .28. The similar product of our invention containing the same percentages of magnesium carbonate and asbestos fiber can be made to weigh as low as 9 lbs. per cubic foot, and will average from 10 to 12 lbs. per cubic foot; the specific gravity, therefore, ranging from .14 to .19. The product of our invention will, thus, average from 35% to 45% lighter than the corresponding product produced by former methods; and even though lighter, it is much stronger. This comparison between 85% magnesium carbonate blocks of our invention and those heretofore produced holds true for any given specification of materials and percentages of magnesium carbonate in the respective blocks. Because of the lightness of the product of our invention, considerable saving in freight charges obtains. Also, due to the low density of our product, it has a lower heat conductivity coefficient than that of products produced by former methods. The heat conductivity coefficient of the product of our invention will run about 20% lower than the corresponding product produced by former methods and containing the same percentages of ingredients.

Although the product of our invention is lighter, it is much stronger than heretofore produced products. Weight for weight, it is 50% to 100% stronger; while a block of our invention, for example an 85% magnesium carbonate block weighing 11 lbs. per cubic foot, will be as strong or even stronger than the corresponding block produced by former methods and averaging 16 to 18 lbs. per cubic foot.

The product of our invention because of its light weight, is highly porous, i. e., cellular in structure, which is one of the factors enabling it to have a high heat insulating efficiency. Furthermore, although the product is shaped, it is not stony or rock-like in character as are artificial stones or natural rocks, but it is chalk-like in character. In other words, compared to an artificial stone or natural rock, it is relatively soft or crushable; the material being readily rubbed off from the surface thereof.

Reference is made to our assignee's copending applications, Serial No. 212,696, filed June 9, 1938, and Serial No. 260,663 filed March 8, 1939, containing related subject matter.

We claim:

1. The method of producing a set magnesium carbonate composition which comprises effecting a reaction between a magnesium compound and a metallic carbonate salt to precipitate normal magnesium carbonate in the form of needle-like crystals having self-setting properties, terminating the reaction prior to conversion of said self-setting magnesium carbonate crystals to basic magnesium carbonate so that said self-setting magnesium carbonate crystals form the final precipitate for production of the product to be set, casting a slurry containing such crystals into a form prior to settling thereof, and applying heat to the slurry in the form to enhance setting of such slurry to a firm cake.

2. The method of producing a set magnesium carbonate composition which comprises effecting a reaction in an aqueous vehicle under conditions of heat and agitation between a magnesium compound and a water soluble metallic carbonate salt to precipitate normal magnesium carbonate in the form of comparatively thin needle-like crystals having self-setting properties independent of application of pressure, controlling the temperature to avoid destruction of the self-setting properties of such precipitate, terminating the reaction prior to conversion of said self-setting magnesium carbonate crystals to basic magnesium carbonate, casting a slurry containing said self-setting magnesium carbonate crystals into a form prior to setting thereof, applying heat to the slurry in the form to enhance setting of the slurry to a firm cake, and subsequently drying the resultant cake.

3. The method of producing a set magnesium carbonate composition which comprises effecting a reaction in an aqueous vehicle under conditions of heat and agitation between magnesium bittern and a water soluble metallic carbonate salt to precipitate normal magnesium carbonate in the form of comparatively thin needle-like crystals having self-setting properties independent of application of pressure, controlling the temperature to avoid destruction of the self-setting properties of such precipitate, terminating the reaction prior to conversion of said self-setting magnesium carbonate crystals to basic magnesium carbonate, washing said self-setting magnesium carbonate crystals substantially free of impurities, casting a slurry containing said self-setting magnesium carbonate crystals into a form prior to setting thereof, applying heat to the slurry in the form to enhance setting of the slurry to a firm cake, and subsequently drying the resultant cake.

SAMUEL A. ABRAHAMS.
RUBIN LEWON.

CERTIFICATE OF CORRECTION.

Patent No. 2,209,753. July 30, 1940.

SAMUEL A. ABRAHAMS, ET AL.

It is hereby certified that error appears in the printed specification of the above numbered patent requiring correction as follows: Page 5, first column, line 22, claim 1, for the word "settling" read --setting--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.